United States Patent
Otterness et al.

(10) Patent No.: US 6,792,472 B1
(45) Date of Patent: Sep. 14, 2004

(54) SYSTEM, METHOD AND COMPUTER READABLE MEDIUM FOR INTELLIGENT RAID CONTROLLERS OPERATING AS DATA ROUTERS

(75) Inventors: Noel S. Otterness, Boulder, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,775

(22) Filed: Mar. 31, 2000

(51) Int. Cl.⁷ .................. G06F 15/173; G06F 11/00; G06F 13/00
(52) U.S. Cl. .............. 709/239; 711/100; 714/4
(58) Field of Search ................ 709/238–239; 370/217, 237; 711/114

(56) References Cited

U.S. PATENT DOCUMENTS

| | | | |
|---|---|---|---|
| 6,094,699 A | * 7/2000 | Surugucchi et al. | 710/314 |
| 6,215,765 B1 | * 4/2001 | McAllister et al. | 370/217 |
| 6,324,161 B1 | * 11/2001 | Kirch | 370/217 |
| 6,496,505 B2 | * 12/2002 | La Porta et al. | 370/392 |
| 6,519,224 B2 | * 2/2003 | Hrastar et al. | 370/227 |
| 6,625,650 B2 | * 9/2003 | Stelliga | 709/226 |

OTHER PUBLICATIONS

Spiegel et al. "An Alternative Path Routing Scheme Supporting QOS and Fast Connection Setup in ATM Networks", IEEE GLOBECOM '94, vol. 2, pp. 1224–1230.*

Clarke, Ian "A Distributed Decentralized Information Storage and Retrieval System" Division of Informatics, Univ. of Edinburgh, 1999.*

* cited by examiner

Primary Examiner—David Wiley
Assistant Examiner—Joseph E Avellino
(74) Attorney, Agent, or Firm—Dorsey & Whitney LLP (57) ABSTRACT

A system, method, and computer program on a computer readable medium for allowing multiple controllers to communicate with other controllers through the use of a routing table are disclosed. The controllers do not need to be directly connected to each other as long as there is a path through other controllers to reach each other. Routing tables used to determine the optimal communications paths between controllers. These techniques are disclosed that allow the controllers to compute the optimal communications path between two controllers. A first technique computes the path which crosses the least number of controllers to reach the controller to which the message is being sent. A second technique is to compute the path which has the least data traffic crossing the controllers and the interconnects. A third technique combines the first two techniques in that it uses both pieces of information, the shortest route and minimal data traffic, to determine an optimal routing path.

42 Claims, 5 Drawing Sheets

SYSTEM, METHOD AND COMPUTER READABLE MEDIUM FOR INTELLIGENT RAID CONTROLLERS OPERATING AS DATA ROUTERS

FIELD OF THE INVENTION

The present invention relates generally to systems and methods for routing data in a computer system having multiple storage devices, and more particularly, to systems and methods utilizing RAID controllers as intelligent data routers.

BACKGROUND OF THE INVENTION

The standard storage sub-system model consists of one or more host computers attached to at least one storage device. This is true for the external storage controller model, whereas the internal storage controller model tends to be one of one or more host computers, each with its own storage controller, attached to a common array of disks. Centralization of data is a common goal in both cases.

Figure 1:
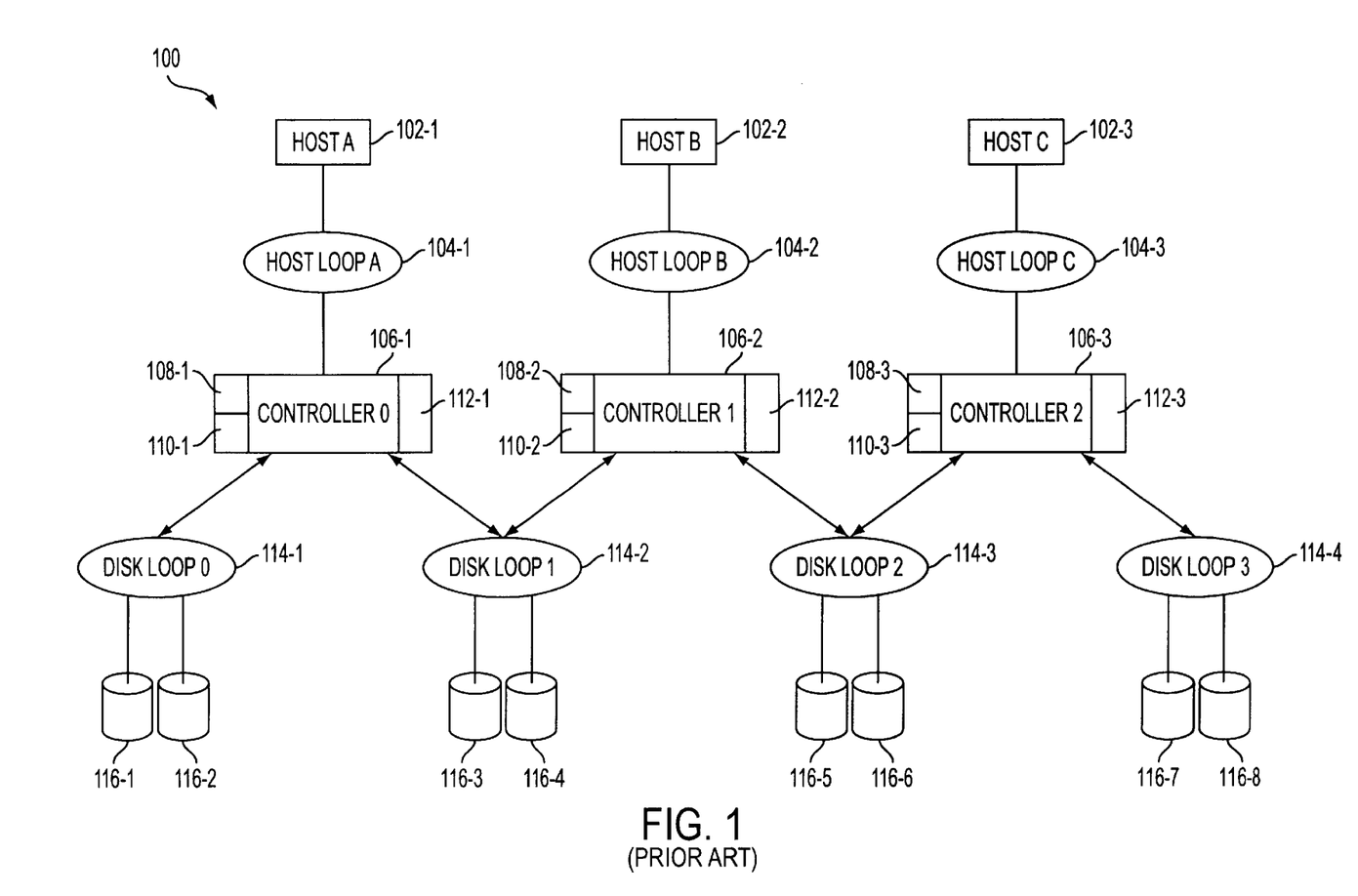
FIG. 1 is an illustration of an exemplary computer system employing multiple host computers, controllers, and shared storage devices.

FIG. 1 shows a block diagram of a typical multiple-controller RAID system 100 (RAID is an acronym for "Redundant Array of Independent Disks"). Each host computer 102 is connected to a respective RAID controller 106 (e.g. 106-1, 106-2, 106-3) through either a Fibre Channel or SCSI bus 104 (e.g. 104-1, 104-2, 104-3). Each RAID controller 106 (e.g. 106-1, 106-2, 106-3) coordinates reading and writing requests from a respective host 102 (e.g. 102-1, 102-2, 102-3) directed to a shared set of storage devices 116 (e.g. 116-1, 116-2, 116-3) to which the RAID controllers 106 are connected, for instance, via a device such as a backend bus 114, again typically a Fibre Channel or SCSI disk bus 114. The controllers 106 may share or use the same storage devices 116 so that each host computer 102 can access the same data. FIG. 1 shows three controllers; however, the illustrated architecture is extendable to systems of N controllers (where N is an integer greater than 2). Each controller 106 include processors 108 as well as memory 110, coupled to the processor 108 in a conventional manner. Controllers 106 are currently used as forwarding devices for host data traffic to a non-volatile storage medium such as disks. Often a RAID controller has a cache 112 to improve the rate at which data can be written to or be retrieved from the backing storage medium.

Centralized data storage in a single storage pool has been implemented to minimize the difficulty of accessing the data from multiple systems and reduces the management effort required for the data. The problem with centralized data storage is that it requires either a large investment up front in excess capacity to allow the system to accommodate future storage requirements, growth or the addition of storage sub-systems at a later date which may not easily work or integrate with the other sub-systems in the storage pool. Fault tolerance may also be compromised as a system grows to include a large number of controllers servicing multiple disks arranged in disk loops because more different error handling routines are required of a routing processor as different equipment is added. Another problem with current RAID systems is that a single processing unit is responsible for managing all of the data movements and interactions with the host systems and storage devices, which can become a bottleneck for system performance. For a configuration having a large number of disk loops and controllers as may be found in current systems, it is impractical to connect all of the disk loops to all controllers, but a routing structure and mechanism for getting to the data on disk loops which are not directly attached to a controller is still needed to provide for fault tolerance and a more efficient management of storage resources.

SUMMARY OF THE INVENTION

The present invention allows multiple controllers to communicate with any number of other controllers through the use of a routing table. The controllers do not need to be directly connected to each other as long as there is a path through other controllers to communicate with each other. Each controller maintains a routing table which can be used to determine the optimal path to allow two controllers to communicate. Three techniques allow the controllers to compute the optimal communications path between two controllers. A first technique is to compute the path which crosses the least number of controllers to reach or otherwise communicate with the controller to which the message is being sent. A second technique is to compute the path which has the least data traffic crossing the controllers and the interconnects. A third technique combines the first two techniques in that it uses both pieces of information, shortest route and minimal data traffic to determine an optimal routing path. A dynamic communications path between controllers can optionally be locked into place to minimize the need to compute the data routing path between controllers every time a message needs to be sent between two controllers. The data path can change as controllers or interconnects in the system change. The routing table may be dynamic in nature, and take into account the insertion and removal of controllers into the system. Each controller may optionally have the ability to cache messages that are routed through it such that if another controller requests the same message it does not always need to go back to the source controller to access the information. Each controller may optionally also have a method for invalidating cached data within itself and to inform other controllers that the cached data needs to be invalidated.

In one aspect, the present invention provides a system of storage device controllers controllably connected to allow routing of messages between the controllers, the system comprising: a selection means for selecting one or more messaging paths across the controllers; a message to be transported across the messaging paths; and a routing means to transport the message between a source controller and a destination controller across the messaging path.

In another aspect, the present invention provides a method of routing messages across a network of storage device controllers comprising the steps of: identifying paths between source controllers and destination controllers; and routing messages across between the paths between the source controllers and the destination controllers.

In yet another aspect, the present invention provides a computer program and a computer readable medium containing instructions which, when executed by a computer, route messages across a network of storage device controllers by: identifying paths between source controllers and destination controllers; and routing messages across between the paths between the source controllers and the destination controllers.

BRIEF DESCRIPTION OF THE DRAWINGS

The present invention will be better understood through the detailed description and accompanying drawings, in which.

DETAILED DESCRIPTION OF EMBODIMENTS OF THE INVENTION

The present invention provides the ability to use storage controllers as intelligent routers. By distributing routing tasks between multiple controllers and using routing tables, the bottleneck of routing with a single processor (or even with a small number of processors) may be eliminated and communications may be routed more efficiently. The cache 112 of a controller may provide a routing mechanism by passing a message which is being forwarded to allow for the staging of the data without halting the sending controller. To accomplish this, two forms of routing can be used. Under the first form of routing, an assumption is made that the message will reach the destination unless a failure notification is received. This can be used for messages which can be regenerated if a failure occurs. Under the second form of routing, the original message is held until a notification is received that the message has successfully reached its destination. It is important to understand that most systems employing multiple controllers may have a higher degree of connectivity between controllers than the system shown in FIG. 1. For instance, rather than the simple linear arrangement of controllers 106 as in FIG. 1, the controllers may be connected via an intercontroller bus or other communication medium.

One use of the present invention is remote data storage. Where a data storage network is distributed across several interconnected sites, data from one facility may be backed up at another facility's site. One advantage of having routing controllers is that if a particular connection between two facilities fails, there is still an alternative connection between these two facilities through another facility.

Figure 2:
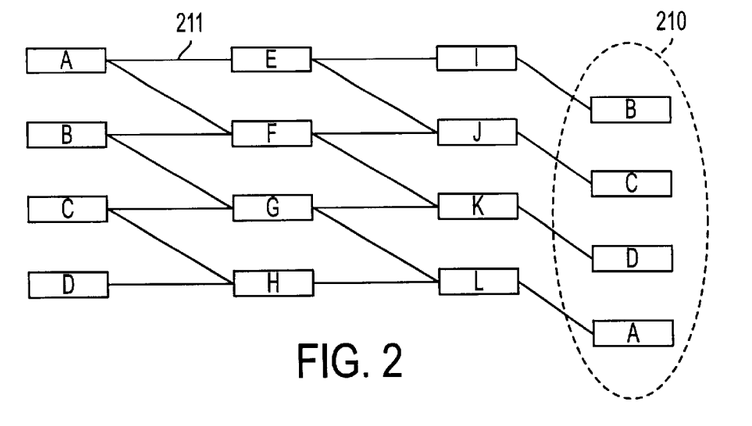
FIG. 2 is an illustration of an embodiment of a routing table constructed in the memory of a controller.

With reference to FIG. 2, a routing table 200 may be constructed and stored in memory 110 by each controller 106 to determine over which paths a message needs to be sent to reach the destination controller. Memory 110 may include random access memory, non volatile random access memory, or other suitable storage devices. The routing table 200 may be implemented as a data structure such as a linked list, array, or other suitable structure. The routing table 200 resides in the memory of each controller 106 and includes the identities of the other controllers 106, represented as nodes on a graph labeled A through L and the various communications paths between them. These paths are identified by lines such as line 211, where a line between two controllers identifies a direct connection and multiple lines traverse one or more other controllers in an indirect connection. In order to traverse the controllers, the message must be transmitted over these paths. The routing table 200 may be stored in memory and utilize data structures representing the individual controllers and paths. A controller can be identified by a binary address corresponding to the node in the routing table.

Figure 3:
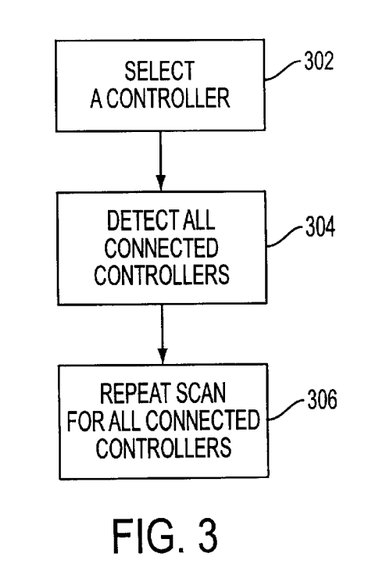
FIG. 3 is a flow chart illustrating an embodiment of the logical sequence of steps to perform a routing scan to construct the routing table.

The routing table 200 is constructed in the memory of one or more of controllers 106 when controller 106 performs a routing scan on each controller following the recursive steps shown in the flowchart diagram of FIG. 3. A routing scan is performed when a signal is transmitted via bus 114 to detect any connected components, such as used in auto configuration functions. Scanning is well known to those skilled in the art and need not be discussed in detail herein. Beginning at step 302, a controller is selected. At step 304, each controller connected directly to the selected controller is detected by performing a scan on the selected controller. Continuing to step 306, a routing scan is performed on each of the connected controllers, continuing until wrap around is achieved (as shown with connections to nodes in column 210 in FIG. 2) or it is determined that the controller is disconnected. The routing scan may be repeated every time the controller receives a message that a controller has been added or removed; or, in an alternative preferred embodiment, the routing scan may be performed at specified intervals.

Figure 4:
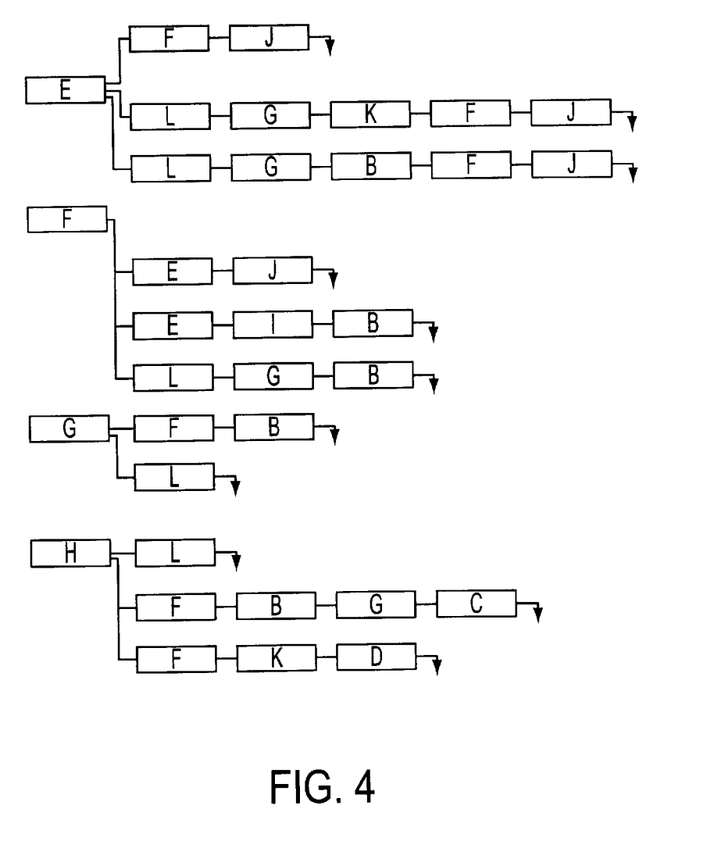
FIG. 4 is an illustration of routing paths over which messages may be sent between a source controller and a destination controller.

Once the routing scans are completed and the routing table 200 is constructed in the controllers 106, the routing table 200 is queued and traversed by each controller to reach each of the remaining controllers. This forms paths beginning at a source controller and traversing paths across one or more controllers to a destination controller. Often multiple paths are detected and traced. As shown in FIG. 4, where controller A is the source controller and the routing table 200 is traversed to destination controllers E, F, G, and H, at least two paths for each destination controller are found. Each destination controller calculates two pieces of information about each routing path: the number of controllers the data message needs to cross through to reach its final destination and the time it takes to reach the final destination through each routing path. The time it takes for a message to reach its destination controller may be calculated by summing the time it takes for each controller to process a message and how long it takes to transfer a command between controllers via different communications paths. An alternate technique is to send a ping message to the destination via each routing path and measure the actual time it takes to receive a response. A ping message is a message sent between computers that contains information describing the time it takes the message to be passed between computers as is known in the art. Other techniques for determining the one-way and round trip times are known in the art and may be used in conjunction with the invention.

The paths found are then evaluated for efficiency. This is accomplished by allowing an intelligent routing algorithm to determine which path or paths are most efficient to communicate with alternate controllers. Choosing a path having a minimal controller count (least node count method) is one way of selecting an optimal path. An optimal bandwidth distribution method can also be used to compute the optimal path based on the current data traffic flowing through each controller based on the time information and known bandwidth capabilities of the controllers in the path. Alternatively, a technique that is a hybrid of the least node count and optimal bandwidth distribution methods can also be used, combining a search to find the quickest path while also trying to limit the number of controllers the data must move through to reach the other controller. This latter method will be referred to as the hybrid message routing method.

In addition to the controller count and the time information, the controller routing table may contain information which ranks the desirability of the various routing paths. For instance, a reliability ranking may be assigned to each controller based on other predetermined factors, for example, frequency of failure, delay, sporadic traffic, and the like. The rank of each controller in a path may be evaluated when a path is to be locked. The locked in path usually is the most desirable path with the alternate paths being used only when a more desirable path fails. It is advantageous for each controller to have at least two distinct paths to reach a destination to allow for failure of intermediary controllers. In the present invention, two or three optimal paths are retained in the routing table while inefficient paths are discarded. This limits the storage and memory requirements for storing the routing information.

The controllers can create a dynamic data path between each other to allow for quicker message passing. This is done by marking in the routing table 200 the preferred controllers and data paths which are used to forward data from one controller to another and using those paths until a failure in one of the data paths takes place. The lock may be indicated by flipping a bit on the controller entry in the router table 200. Routing paths may also be indicated by numbering the controllers. For example, a primary path may indicated by controllers in routing table 200 that have a value "1" in a certain area. If that path fails, controllers having a value "2" may be tried. This ranking may be continued for additional paths.

Figure 5:
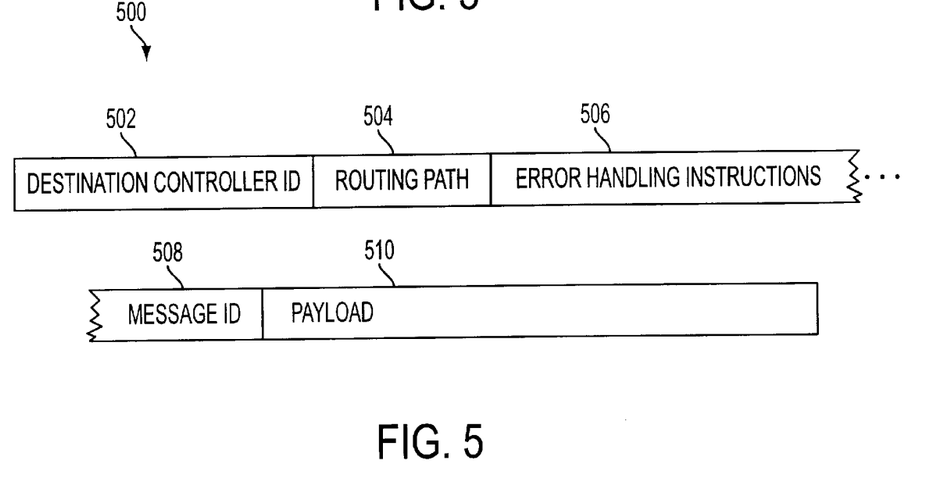
FIG. 5 illustrates the organization of an exemplary embodiment of a message passed between controllers.

Directing attention to FIG. 5, routing information contained in a message 500 passed between controllers may include the final destination controller identifier 502, a routing path 504 which identifies how the message will reach its final destination controller, error handling instructions 506, a unique message identifier 508 that allows the data message to be cached on the controller, and a payload 510. The payload may contain whatever data is to be transported between controllers in the system, such as text, audio, video, or other data.

If a controller cannot pass the message on to the next controller in the routing list, it can handle the message in one of two ways. The simplest is to pass the error status back to the originating controller. In this case the originating controller switches its routing path to use one which avoids the problem controller and resends the message. Alternatively, the controller which experiences the problem may perform the rerouting itself. This controller finds a new route and sends the message accordingly. The routing table is modified to reflect the new route taken. This is an aspect of the dynamic routing and rerouting provided by the inventive structure and method.

The cache memory 112 allows the message to be stored even after it is transferred to another controller. By retaining the message in the cache 112 for as long as possible, a system may be more robust in that the controller storing the message may provide it to other controllers so that the source controller does not need to transport it every time. This is useful where there is an error in transmission and re-routing is required. Each controller is able to invalidate cached data within itself and to inform other controllers that the cached data needs to be invalidated. Cache invalidation may be performed by a controller that broadcasts an invalidation message to the other controllers in the system by identifying a range of sectors that contain the volume of data that is to be discarded by the other controllers. In a preferred embodiment, data remains in the cache of each controller until either an invalidation message is received or the controller's cache becomes full and the controller needs to store fresh data.

Figure 6:
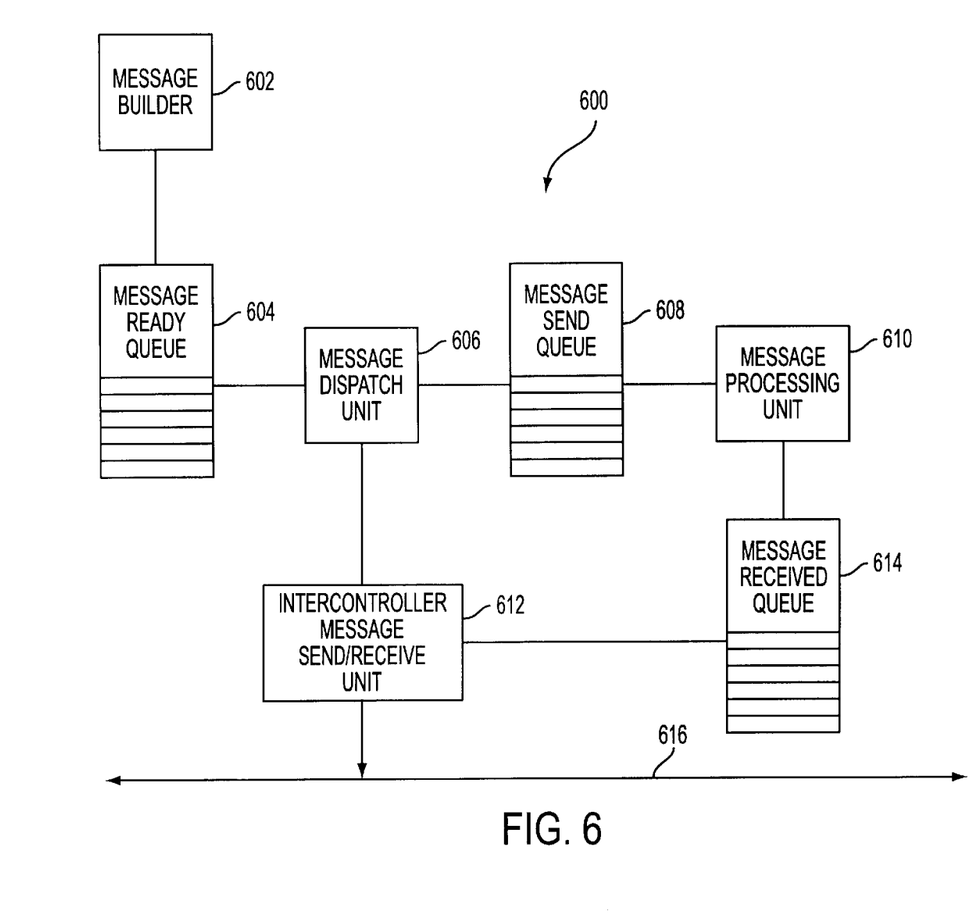
FIG. 6 is an illustration in block diagram form of an embodiment of software modules utilized by a controller to perform message routing.

Directing attention to FIG. 6, program 600 (stored in memory 110) includes modules used to implement aspects of the present invention are described. The message builder 602 is responsible for building the message routing information required for a message to reach its required destination. At least three types of messages may be supported: general broadcast, known destination, and broadcast subset, but the invention is not limited to these message types. In the general broadcast scenario, messages are sent to all controllers 106 in the system 100. A known destination message is directed to a specific controller, though it may pass through several controllers to reach its destination. In a broadcast subset, messages are sent to multiple controllers 106 in system 100 but not necessarily to all controllers. It can be considered a superset of the known destination message. High level software in the controller 106 or application layer may provide a list of destination controllers which are to receive the message.

All active controllers and the manner in which they may be accessed may be listed in the routing table 200. The routing table information is used to build a messages routing list. If there are N controllers in the routing table (which corresponds to N controllers in the system) a broadcast message may cause N individual messages to be sent across the intercontroller bus 616.

The message builder 602 corresponds to the application which needs to communicate with other controllers. In a preferred embodiment of the present invention, the message builder 602 is implemented in the code which constructs the message to contain the destination controller information. Once the destination information is placed in the message, the message is placed on the message ready queue 604. The message ready queue 604 is a queue which may be implemented as an array or stack of messages which have been built but have not been sent. By utilizing a queue, the transmission of messages may be synchronized with application code that requires communication between the controllers.

The message dispatching unit 606 is responsible for attaching the routing information to a message. The routing information contains a list of controllers across which the message is to be sent. The message dispatch unit 606 may be implemented in a program module that constructs and maintains the routing table, and may also store information from the routing table. The message dispatch unit 606 may also generate multiple messages from a single message which is pulled off of the message ready queue 604. Messages which require a response may be tagged and placed into the message sent queue 608 to allow for further processing when either the response is received or a period of time has passed and the response is deemed to have timed out and thus represents an error condition. The controller 106 also needs to be capable of rerouting a message in the event one of the transfers between controllers fails. This requires the message routing logic be able to unwind back or otherwise restore a previous state and attempt alternate paths.

The intercontroller message sending/receiving unit 612 is responsible for interpreting the message routing information and either placing the message into the message received queue 614 if the message is from the destination controller or forwarding the message to the next controller in the list of controllers contained in the routing information. In the event that the next controller to receive the message is not accessible through the routing table, the intercontroller message sending/receiving unit 612 may query the message dispatch unit 606 to find an alternate route. If an alternate route is available, the intercontroller message sending/receiving unit will modify the routing table and send the message to the next controller in the alternate route. If an alternate route is not available, the message will either be returned with an error or discarded, where the choice of these two alternates may be based on the type of message.

The message sent queue 608 may be implemented as a queue that holds messages which have been sent but to which a response has not been received. Certain message types which do not require a response from the destination controller need not be placed in the message sent queue. The message processing unit 610 is where message responses are matched up to the sent message and the two (sent messages and response messages) are sent to the message builder 602, which may then pass the information to an application layer. The message received queue 614 serves as a temporary buffer to hold incoming messages until they can be processed by the message processing unit 612.

Figure 7:
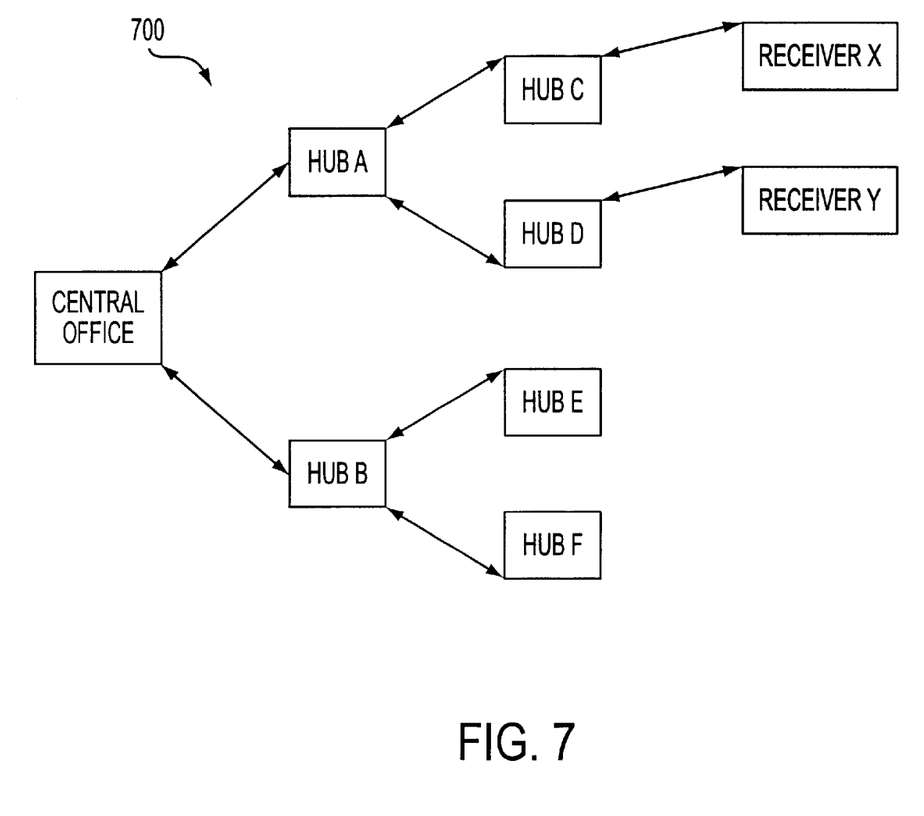
FIG. 7 is an illustration of a practical application of the present invention in a television network.

As described above, the present invention may utilized to reduce routing bottlenecks occurring in conventional systems employing multiple controllers. The present invention may also be used in conjunction with applications such as cable or satellite television systems, where video data is provided in an on demand basis. As illustrated in FIG. 7, RAID controllers may be used as hubs A through F in a television network 700. If user X wants to view a movie, the video data must be first transmitted by the central office through hub A and then through hub C before reaching user X's receiver. If the video data is cached along the way, when user Y wants to watch the movie, the data can be transmitted to hub D from data cached in hub A instead of being retransmitted from the central office. This greatly reduces the bandwidth requirements of the links between the central office and hubs A and B. The present invention facilitates such a system where both user X and Y wish to watch the same movie within a relatively short time from each other. Once the two data streams are determined to be the same, each packet can be routed to multiple destinations. In this case, the central office would mark each packet with multiple destinations, hub C and D. The data packets arrive in a single entity to hub A, which in turn generates duplicate packets for each received packet, and divides them between hubs C and D.

This type of intelligent routing is well suited for Internet applications as well. Certain web pages receive an enormous number of hits per day. Data from a popular web page can easily be cached throughout the Internet and maintained by the cache invalidation methods described above. Implementation of the present invention in this application would improve traffic flow throughout the Internet as well as decreasing bandwidth requirements for high volume web sites.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention not be limited by the above descriptions, but instead be determined by reference to the claims that follow.

What is claimed is:

1. A message routing system routing messages between a plurality of RAID controllers, said system comprising:
    (a) selection logic in at least one RAID controller for selecting at least one messaging path from among a plurality of alternative paths across said plurality of RAID controllers; and
    (b) at least one routing table stored in said at least one of said plurality of RAID controllers for transporting said message between a source RAID controller and a destination RAID controller across said messaging path.

2. The message routing system of claim 1, further comprising a message to be transported across said messaging paths.

3. The system as defined in claim 2, wherein said message contains an identifier of the destination controller.

4. The system as defined in claim 1, wherein said selection logic includes a routing table that indicates connections between said controllers across which messages may be transported.

5. The system as defined in claim 1, wherein the massage contains routing path information.

6. The system as defined in claim 1, wherein the message contains an error handling instruction.

7. The system as defined in claim 1, wherein the message contains a unique message identifier.

8. The system as defined in claim 1, wherein the message contains data.

9. The system as defined in claim 1, wherein said at least one of said plurality of RAID controllers includes logic for rerouting a message if a failure occurs over a selected path.

10. A system according to claim 1, wherein each of said plurality of RAID controllers stores a routing table.

11. A system according to claim 1, wherein:
    said selection logic includes a routing table that indicates connections between said controllers across which messages may be transported and said message contains an identifier of the destination controller, routing path information, an error handling instruction, a unique message identifier, and data; and
    each of said plurality of RAID controllers stores a routing table.

12. A method of routing messages to a destination RAID controller using a routing RAID controller across a network of RAID storage device controllers comprising:
    scanning the network of RAID storage device controllers with the routing RAID controller;
    storing a routing table in the routing RAID controller indicative of identities of each RAID controller in the network of RAID storage device controllers connected to the routing RAID controller;
    identifying paths between the routing RAID controller and a destination RAID controller and storing the identified paths in the routing table;
    selecting a path from said identified paths; and
    routing a message across said selected path between said routing RAID controller and said destination controller.

13. The method in claim 12 wherein paths are identified between all connected controllers and said connected path is selected as the path having a minimum of interposed controllers.

14. The method as described in claim 12, wherein said identified paths are selected for having a minimal number of controllers.

15. The method as described in claim 12, wherein said paths are selected for having controllers with the least amount of traffic across them.

16. The method as described in claim 12, wherein said paths are selected for having both the least number of controllers and the least amount of traffic.

17. The method as described in claim 12, wherein said step of scanning is performed whenever a controller is added or deleted from said network.

18. The method as described in claim 12 further comprising the step of rerouting the message if a controller in said selected path fails.

19. The method as described in claim 1, wherein said step of rerouting is performed by the controller that first detects the failed path.

20. The method as described in claim 12, wherein said selected path can be locked.

21. The method as described in claim 12, wherein said message is stored in a cache memory of each controller along the path.

22. The method as described in claim 21, further comprising the stop of retaining said message in the controller after the message is sent.

23. The method as described in claim 21, further comprising the step of transmitting the message to other controllers besides the next controller in the path.

24. A method according to claim 12, further comprising the step of:
   rerouting the message if a controller in said selected path fails, said step of rerouting is performed by the controller that first detects the failed path, said selected path can be locked, and message is stored in a cache memory of each controller along the path;
   retaining said message in the controller after the message is sent; and
   transmitting the message to other controllers besides the next controller in the path; and
   wherein:
   paths are identified between all connected controllers and said connected path is selected as the path having a minimum of interposed controllers; and
   said identified paths are selected for having at least one of a minimal number of controllers and controllers with the least amount of traffic across them, and for having both the least number of controllers and the least amount of traffic;
   said step of scanning is performed whenever a controller is added or deleted from said network.

25. A computer readable medium containing instructions which, when executed by a routing RAID controller, route messages across a network of storage device controllers by:
   scanning the network of RAID storage device controllers with the routing RAID controller;
   storing a routing table in the routing RAID controller indicative of identities of each RAID controller in the network of RAID storage device controllers connected to the routing RAID controller;
   identifying paths between the routing RAID controller and destination controllers and storing the identified paths in the routing table;
   selecting a path from said identified paths; and
   routing a message across said selected path.

26. A computer readable medium according to claim 25, wherein at least one of said controllers comprises a storage device controller.

27. A computer readable medium according to claim 26, wherein said storage device controller is configured to coordinate reading and writing requests to a storage device from a host.

28. A RAID storage device controller, comprising:
   (a) a routing table containing entries representing a plurality of RAID device controllers connected to said RAID controller; and
   (b) logic for routing data transmission through said plurality of device controllers.

29. The storage device of claim 28, further comprising logic to detect a failed controller within said plurality of device controllers.

30. The storage device of claim 29, further comprising logic for routing data through an alternate path through said plurality of device controllers.

31. A storage device controller according to claim 25, wherein said storage device controller is configured to coordinate reading and writing requests to a storage device from a host.

32. A method of operating a routing RAID device controller, comprising the steps of:
   (a) creating a routing table stored in the routing RAID device controller containing entries representing a plurality of RAID device controllers connected to said routing RAID device controllers;
   (b) utilizing said routing table to construct at least one routing path from the routing RAID device controller to a destination controller across controllers in said plurality of controllers; and
   (c) transmitting data via said routing path.

33. The method of claim 32, further comprising the steps of:
   (a) detecting a failed controller along said routing path; and
   (b) transmitting said data via an alternative routing path.

34. The method of claim 32, further comprising the step of locking said routing path.

35. A method according to claim 32, wherein at least one of said controllers comprises a storage device controller.

36. A method according to claim 35, wherein said storage device controller is configured to coordinate reading and writing requests to a storage device from a host.

37. A data routing system for routing data between first and second RAID controllers in a network having a plurality of RAID controllers, said system comprising:
   selection logic stored in the first RAID controller, including a routing table that identifies possible transmission paths between said plurality of RAID controllers across which said data may be transmitted, for selecting at least one particular data transmission path from among a plurality of alternative paths between said first and second controllers; and
   routing logic in said first RAID controller for transmitting said data between said first controller and said second controller across said particular selected transmission path, said data including a unique data item identifier and data routing information;
   said routing logic including rerouting logic for rerouting a transmission if a failure occurs over a selected path.

38. The data routing system in claim 37, wherein said network comprises a global network of interconnected computer systems (internet), and said data comprises content communicated between a source and a destination.

39. A data routing system according to claim 37, wherein at least one of said controllers comprises a storage device controller.

40. A data routing system according to claim 39, wherein said storage device controller is configured to coordinate reading and writing requests to a storage device from a host.

41. A method of routing information between and among a plurality of RAID data storage subsystem controllers interconnected by a network of communication paths, said method comprising:

identifying communication paths between said RAID data storage subsystem controllers over said network, including direct communication paths not passing through other ones of said RAID data storage subsystem controllers and indirect communication paths passing through said other RAID data storage subsystem controllers;

storing said identified communication paths in a routing table data structure in a memory within each said RAID data storage subsystem controllers, said routing table data structure storing path preference indicia, said path preference indicia selected from the group consisting of, for each identified path: a number of controllers the information needs to transit through to reach its final destination system, a time it takes a transmitted information to reach a final destination system through each identified, a frequency of failure, a delay time, sporadic traffic indicia, and combinations thereof;

selecting a particular communication path from said identified communication paths based on predetermined path selection criteria, said criteria including said stored path preference and predetermined selection rules for selecting an efficient path; and routing said information across said selected communication path between a source RAID data storage subsystem controller and a destination RAID data storage subsystem controller.

42. A message routing system according to claim 41, wherein said storage device controller is configured to coordinate reading and writing requests to a storage device from a host.

\* \* \* \* \*